(12) United States Patent
Zhou et al.

(10) Patent No.: US 12,727,713 B2
(45) Date of Patent: Sep. 8, 2026

(54) FRIED FOOD PREPARATION SYSTEM

(71) Applicant: Yindu Kitchen Equipment Co., Ltd., Hangzhou (CN)

(72) Inventors: Junjie Zhou, Zhejiang (CN); Zhengyu Li, Zhejiang (CN); Xian Ye, Zhejiang (CN); Genhu Li, Zhejiang (CN); Shimin Chai, Zhejiang (CN); Lifeng Ye, Zhejiang (CN); Yunjie Wang, Zhejiang (CN); Changliang Xiao, Zhejiang (CN); Huiying Zhang, Zhejiang (CN); Xuan Xu, Zhejiang (CN)

(73) Assignee: Yindu Kitchen Equipment Co., Ltd., Zhejiang (CN)

( * ) Notice: Subject to any disclaimer, the term of this patent is extended or adjusted under 35 U.S.C. 154(b) by 893 days.

(21) Appl. No.: 18/156,118

(22) Filed: Jan. 18, 2023

(65) Prior Publication Data

US 2024/0164580 A1 May 23, 2024

(30) Foreign Application Priority Data

Nov. 22, 2022 (CN) ........................ 202211467727.1

(51) Int. Cl.

| | |
|---|---|
| ***A47J 37/12*** | (2006.01) |
| ***B25J 9/04*** | (2006.01) |
| ***B25J 11/00*** | (2006.01) |
| ***B25J 15/00*** | (2006.01) |

(52) U.S. Cl.

CPC ....... *A47J 37/1276* (2013.01); *A47J 37/1219* (2013.01); *B25J 9/042* (2013.01); *B25J 11/008* (2013.01); *B25J 15/0042* (2013.01)

(58) Field of Classification Search

CPC . B67D 1/0078; A47J 37/1276; A47J 37/1219; A47J 37/1228; B25J 9/042; B25J 11/008; B25J 15/0042; B25J 15/0253; G07F 17/0085

See application file for complete search history.

(56) References Cited

U.S. PATENT DOCUMENTS

2020/0047349 A1* 2/2020 Sinnet ...................... B25J 5/007

FOREIGN PATENT DOCUMENTS

| | | | | |
|---|---|---|---|---|
| EP | 0455477 A2 * | 11/1991 | ............. | A47J 27/14 |
| WO | WO-2017133131 A1 * | 8/2017 | ............. | B25J 18/02 |

OTHER PUBLICATIONS

Original and English translation of Office Action in CN 100068, published Feb. 25, 2025.

Original and English translation of Notification to Grant Patent Right for Invention of priority document CN2022114677271 May 29, 2025.

* cited by examiner

*Primary Examiner* — Tiffany T Tran

(74) *Attorney, Agent, or Firm* — Antoinette G Giugliano; Antoinette G Giugliano PC

(57) ABSTRACT

Provided is a fried food preparation system, which relates to the technical field of food equipment. The fried food preparation system includes a food dispenser assembly, a manipulator arm assembly, a deep fryer assembly and a frying basket. The deep fryer assembly and the food dispenser assembly are respectively arranged in parallel on both sides of the manipulator arm assembly, wherein the manipulator arm assembly is connected with the frying basket and makes the frying basket move in a plane formed by a first direction and a second direction.

10 Claims, 15 Drawing Sheets

FRIED FOOD PREPARATION SYSTEM

TECHNICAL FIELD

The disclosure relates to the technical field of food equipment, in particular to a fried food preparation system.

BACKGROUND ART

Fried food, such as French fries and fried chicken nuggets, are the main essential food in western fast food restaurants.

Food preparation is labor-intensive, and labor costs account for a large proportion of the total cost of preparing food. In addition, restaurants where food is directly prepared by people may also have problems and potential problems such as smoke and scald. There may also be health and safety concerns if the food is prepared directly by people.

The above problems can be solved by utilizing manipulator arm or robot to automate the frying procedure of the fried food through computer and program.

At present, many types of manipulator arms, which includes gantry walking type, ground walking type or ground standing type, etc., are used for frying food, however, the disadvantage thereof is that gantry support frame needs to be fixed on the ground on site, thus an on-site construction and installation is needed; mechanical arm that types like ground walking or ground standing also occupy the passage, which may lead to large space occupation but also inconvenience of clean and hygiene.

SUMMARY

The purpose of the disclosure is to provide a fried food preparation system, wherein in the space occupied by the original equipment, no on-site construction and installation will be carried out, and the existing arrangement and operation habits will not be changed, which include clean and hygiene, and the use of manipulator arm for frying food instead of manual frying.

There are many difficulties in replacing manual frying with mechanical arm to fry food, for example shaking the frying basket is required in the frying process for the evenness of food frying, and the accuracy and reliability of location that the manipulator arm grabs the frying basket is also required.

The disclosure provides a fried food preparation system, which comprises a food dispenser assembly, a manipulator arm assembly, a deep fryer assembly and a frying basket, wherein the deep fryer assembly and the food dispenser assembly are respectively arranged side by side on both sides of the manipulator arm assembly;

the manipulator arm assembly is connected with the frying basket and the manipulator arm assembly moves the frying basket in a plane formed by a first direction and a second direction;

herein the first direction is the direction from the deep fryer assembly to the food dispenser assembly, and the second direction is a height direction.

In an optional embodiment, the system further comprises a slide base, and the manipulator arm assembly is mounted on the slide base;

the deep fryer assembly and/or the food dispenser assembly are also arranged on the slide base.

In an optional embodiment, the manipulator arm assembly comprises a manipulator arm and a support frame, wherein the manipulator arm has a base that is provided on the support frame, wherein the other end of the manipulator arm is provided with a grasping and shaking device which is connected to the frying basket.

In an optional embodiment, the grasping and shaking device comprises a assembly of a gripper;

the assembly of the gripper comprises a gripper and two fingers which are provided on the gripper, wherein the two fingers move on the gripper along a third direction.

In an optional embodiment, the grasping and shaking device further comprises a shaking component, wherein the shaking component is provided with an actuator, two mounting plates, and clamping structures arranged on the mounting plates, wherein each of the fingers is provided with one mounting plate thereon, and two clamping structures are configured for cooperating with clamping the frying basket;

the clamping structures are connected with the actuator, and the actuator is configured for moving the clamping structures along a fourth direction;

the mounting plate, at one end away from the finger, is provided with a slide rail on which a slide block is slidably disposed, and the clamping structure is provided on the slide block, wherein the fourth direction is a length direction of the slide rail.

In an optional embodiment, there are two actuators, each of the mounting plates is fixedly provided with one actuator, and each of the actuators is connected with a corresponding clamping structure, so as to move the clamping structure along the fourth direction.

In an optional embodiment, the assembly of the gripper further comprises a connecting plate, wherein the gripper is fixed on the connecting plate, and the connecting plate is configured to connect with the manipulator arm.

In an optional embodiment, the actuator is fixedly arranged on the connecting plate, and a telescoping plate is provided on the actuator, wherein a guide rod is disposed on the telescoping plate, and the third direction is a length direction of the guide rod;

the clamping structure is provided with a guide groove that is matched with the guide rod, and the actuator makes the guide rod move along the fourth direction, so as to move the clamping structure along the slide rail In an optional embodiment, the frying basket comprises a basket body and a positioning rod, wherein the positioning rod is disposed on a handle of the frying basket body;

the positioning rod is cylindrical, and a length direction of the positioning rod is perpendicular to a length direction of the handle;

the deep fryer assembly comprises a deep fryer, and a positioning block is provided on the deep fryer, wherein the positioning block is provided with a first positioning slot matched with the handle and a second positioning slot matched with the positioning rod.

In an optional embodiment, the clamping structure is provided with a V-shaped groove, and the handle of the frying basket body is stuck in the V-shaped groove.

In an optional embodiment, the manipulator arm has a plurality of rotary shafts, each of which has same length direction.

In an optional embodiment, a distance between the uppermost rotary shaft of the plurality of rotary shafts and the upper end surface of the deep fryer of the deep fryer assembly is a, wherein a is greater than 400 mm.

In an optional embodiment, the system further comprises a cooked food storage station, which is disposed on one side of the deep fryer assembly away from the manipulator arm assembly.

In the disclosure, the deep fryer assembly and the food dispenser assembly of the fried food preparation system are respectively arranged on both sides of the manipulator arm assembly in parallel, and the manipulator arm assembly can make the frying basket move in a plane formed by a first direction and a second direction, such that the frying basket can be moved from the food dispenser assembly to the deep fryer assembly, wherein the manipulator arm assembly moves only in one plane during the movement of the frying basket, which reduces the occupied space and the space requirements of the entire fried food preparation system is also reduced.

BRIEF DESCRIPTION OF DRAWINGS

In order to more clearly illustrate the specific embodiments of the present disclosure or the technical solution in the prior art, the drawings required to be used in the description of the specific embodiment or prior art will be briefly introduced as follows. Obviously, the drawings described below are some embodiments of the present disclosure, for those of ordinary skill in the art, without paying creative labor, may also obtain other drawings according to these drawings.

REFERENCE NUMERALS

Figure 1:
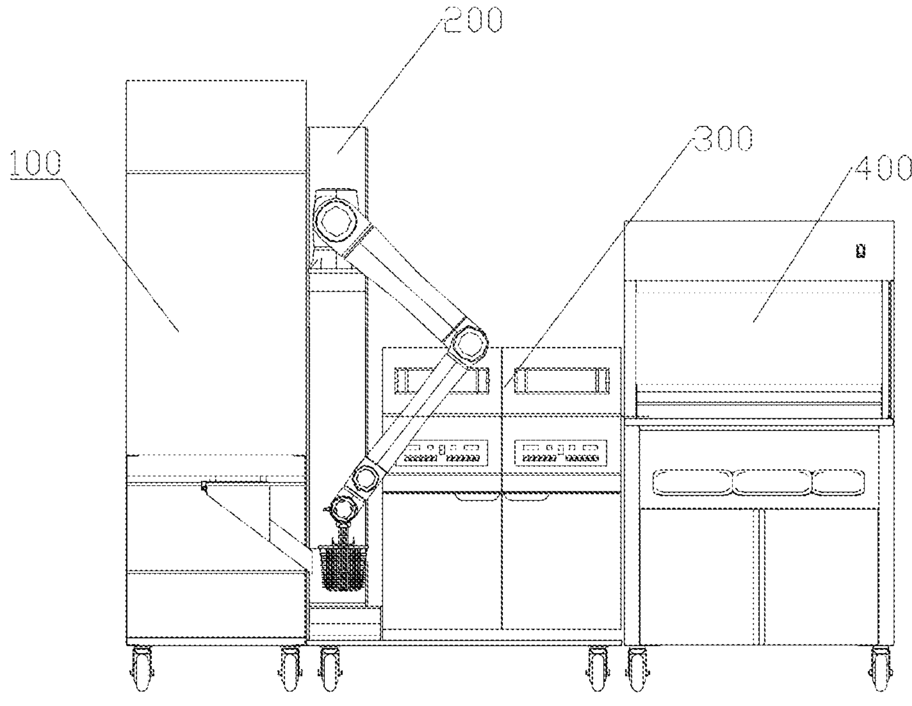
FIG. 1 shows a structural schematic diagram of a fried food preparation system according to an embodiment of the present disclosure.

| | | | |
|---|---|---|---|
| 100 | food dispenser assembly | 200 | manipulator arm assembly |
| 201 | support frame | 202 | manipulator arm |
| 2021 | rotary shaft | 300 | deep fryer assembly |
| 301 | upper end surface | 400 | cooked food storage station |
| 600 | slide base | 700 | grasping and shaking device |
| 800 | frying basket | 801 | frying basket body |
| 802 | handle | 803 | positioning rod |
| 900 | gripper | 110 | finger |
| 120 | mounting plate | 130 | slide rail |
| 150 | slide block | 160 | clamping structure |
| 170 | actuator | 180 | guide groove |
| 190 | connecting plate | 220 | telescoping plate |
| 230 | guide rod | 240 | V-shaped groove |
| 250 | positioning block | 251 | second positioning slot |
| 252 | first positioning slot | 260 | passage |
| 270 | wave wheel | 280 | food bucket |
| 290 | discharge door | 310 | wave wheel motor |
| 320 | weighing mechanism | 330 | freezer. |

DETAILED DESCRIPTION OF EMBODIMENTS

A clear and complete description of the technical solutions of the present disclosure will be given below in connection with embodiments. Obviously, the described embodiments are part of but not all of the embodiments of the present disclosure. Based on the embodiments in the present disclosure, all other embodiments obtained by those of ordinary skill in the art without making creative efforts are within the scope of protection of the present disclosure.

Embodiments

Referring to FIGS. 1-22, the disclosure provides a fried food preparation system, which comprises a food dispenser assembly 100, a manipulator arm assembly 200, a deep fryer assembly 300 and a frying basket 800, wherein the fryer assembly 300 and the food dispenser assembly 100 are respectively arranged on both sides of the manipulator arm assembly 200 in parallel;

the manipulator arm assembly 200 is connected with the frying basket 800, and the manipulator arm assembly 200 moves the frying basket 800 in a plane formed by a first direction and a second direction; and herein, the first direction is a direction from the deep fryer assembly 300 to the food dispenser assembly 100, and the second direction is a height direction.

In some embodiments, the fryer assembly 300 and the food dispenser assembly 100 are respectively arranged on both sides of the manipulator arm assembly 200 in parallel, wherein the food dispenser assembly 100 may be arranged on the left side of the manipulator arm assembly 200, and the deep fryer assembly 300 is arranged on the right side of the manipulator arm assembly 200; Similarly, the deep fryer assembly 300 may be arranged on the left side of the manipulator arm assembly 200 and the food dispenser assembly 100 may be arranged on the right side of the manipulator arm assembly 200.

The manipulator arm assembly 200 is configured for moving the food dispenser assembly 100 which contains food to be fried to the deep fryer assembly 300 for frying. In order to reduce the space occupied by the movement of the manipulator arm assembly 200, the manipulator arm assembly 200 can only move in the plane formed in the first and second directions. In this way, it reduces the space of the passage 260 occupied by the manipulator arm assembly 200, and also reduces the space requirements of the whole fried food preparation system.

Figure 2:
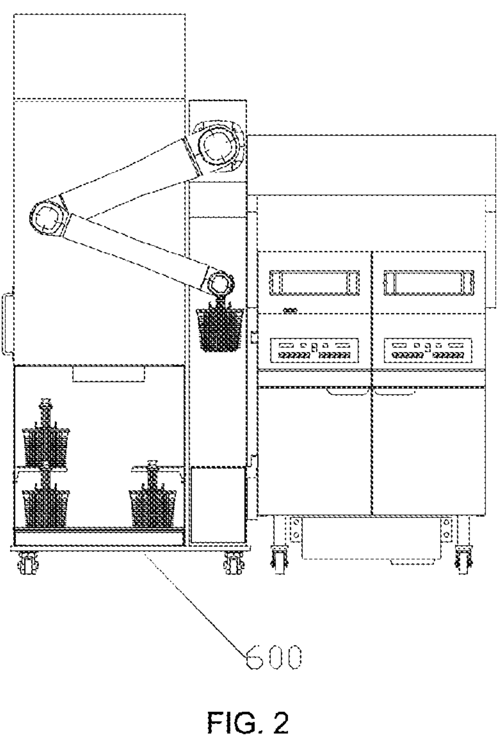
FIG. 2 shows another structural diagram of a fried food preparation system according to an embodiment of the present disclosure.
Figure 3:
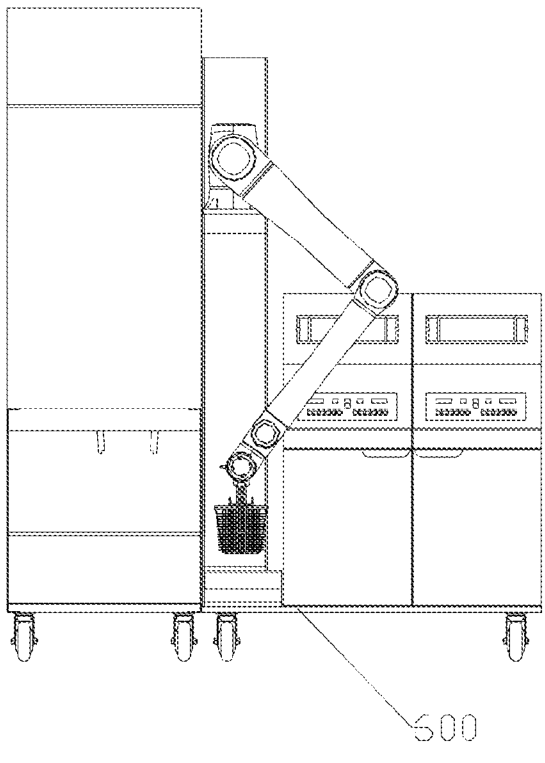
FIG. 3 shows still another structural diagram of the fried food preparation system according to an embodiment of the present disclosure.
Figure 4:
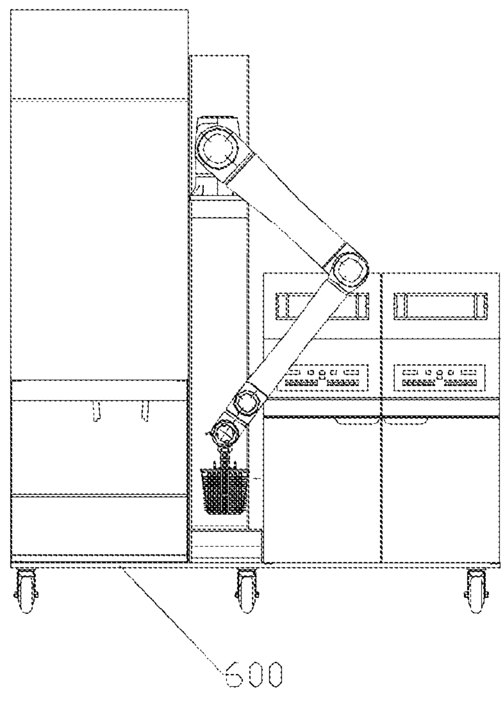
FIG. 4 shows yet another structural diagram of the fried food preparation system according to an embodiment of the present disclosure.

Referring to FIGS. 2, 3, and 4, in an optional embodiment, the system further comprises a slide base 600, wherein the manipulator arm assembly 200 is mounted on the slide base 600; and the deep fryer assembly 300 and/or the food dispenser assembly 100 are also arranged on the slide base 600.

For the convenience regarding to installation and movement of the entire fried food preparation system, the manipulator arm assembly 200 is arranged on the slide base 600, wherein both the deep fryer assembly 300 and the food dispenser assembly 100 may be arranged on the slide base 600, or only one of the deep fryer assembly 300 and the food dispenser assembly 100 may be arranged on the slide base 600.

In this way, it is convenient to move position of the entire fried food preparation system when cleaning, which is conducive to hygienic cleaning, and such an arrangement does not require any additional targeted installation, decoration or complex debugging, so that the purchased fried food preparation system may be quickly put into production.

Figure 6:
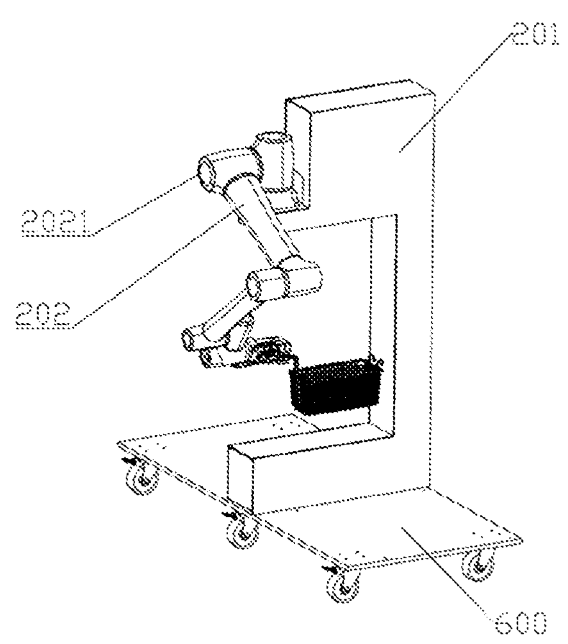
FIG. 6 shows a structural schematic diagram of a connection between a slide base and a manipulator arm assembly of the fried food preparation system shown in FIG. 5.
Figure 7:
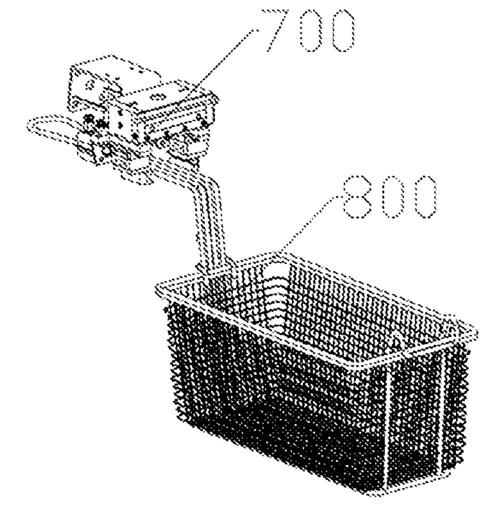
FIG. 7 shows a structural schematic diagram of a connection between a grasping and shaking device and a frying basket of the fried food preparation system according to an embodiment of the present disclosure.
Figure 8:
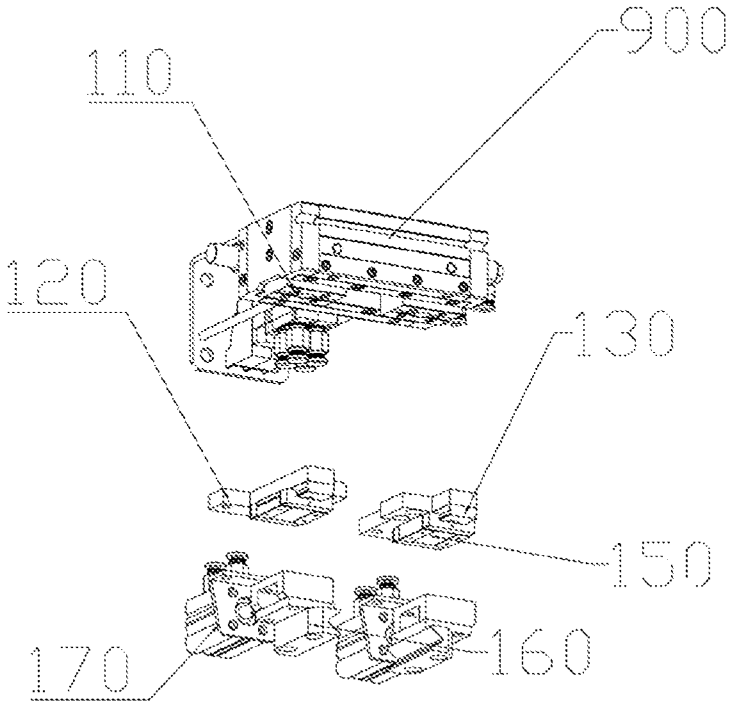
FIG. 8 shows an explosion diagram of the grasping and shaking device of the fried food preparation system shown in FIG. 7.
Figure 9:
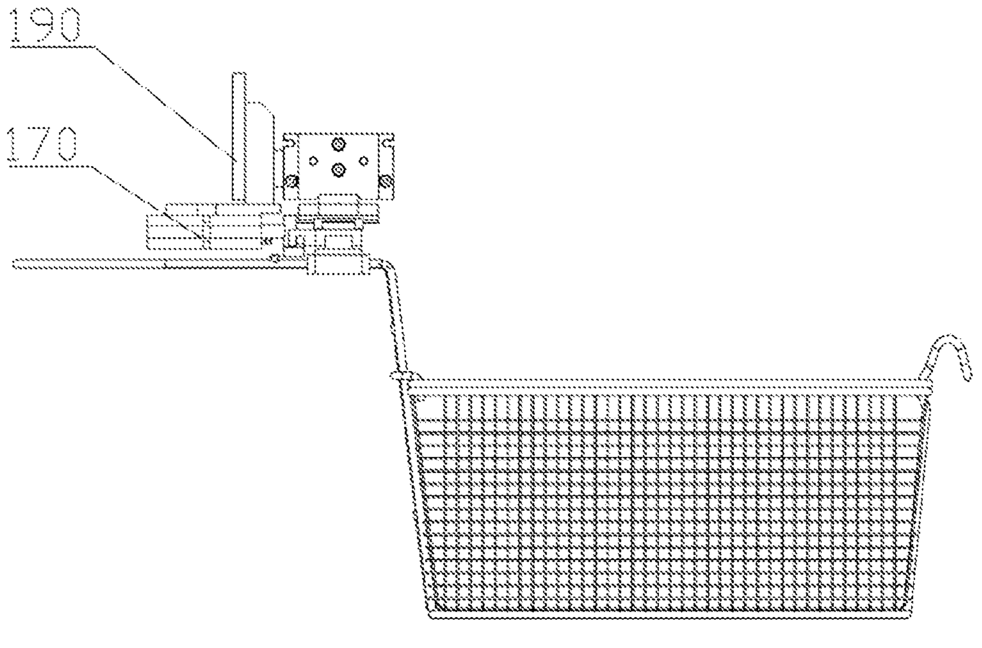
FIG. 9 shows another structural schematic diagram of a connection between the grasping and shaking device and the frying basket of the fried food preparation system according to an embodiment of the present disclosure.
Figure 10:
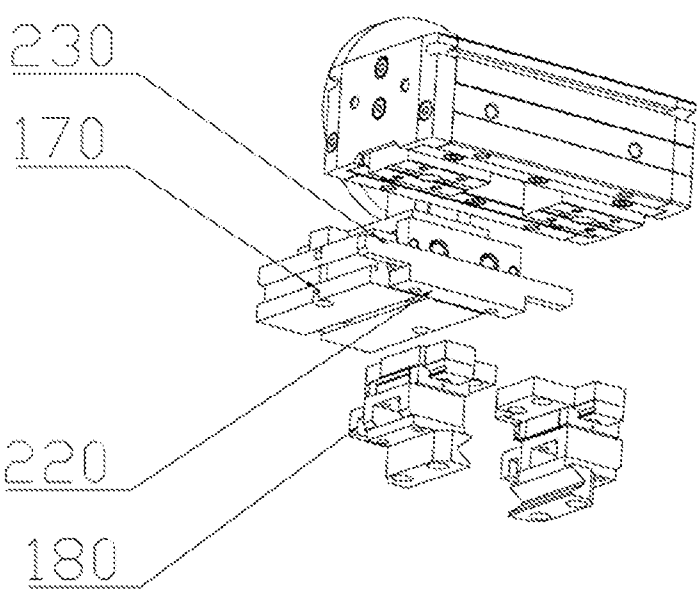
FIG. 10 shows an explosion diagram of the grasping and shaking device of the fried food preparation system shown in FIG. 9.
Figure 11:
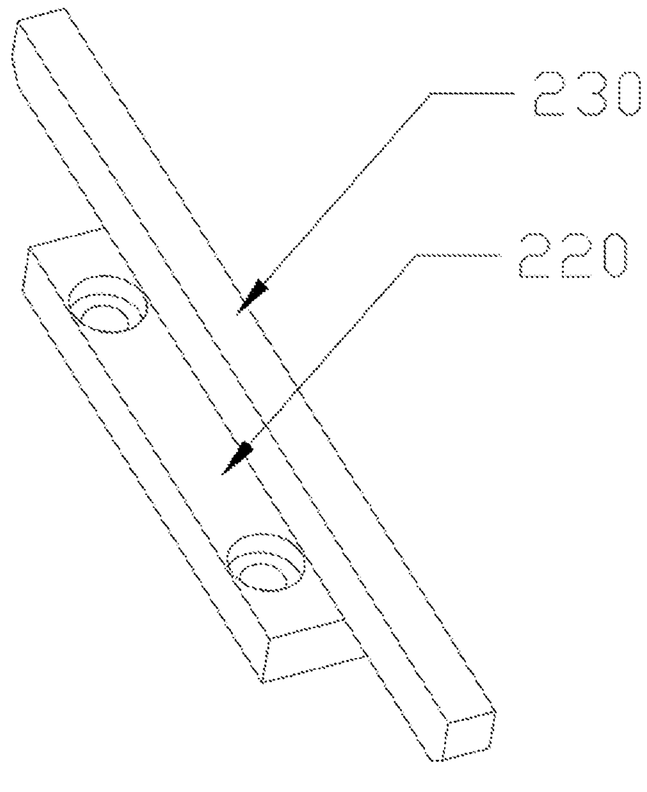
FIG. 11 shows a structural schematic diagram of a connection between a telescoping plate and a guide rod in an explosion diagram of the grasping and shaking device of the fried food preparation system shown in FIG. 10.
Figure 12:
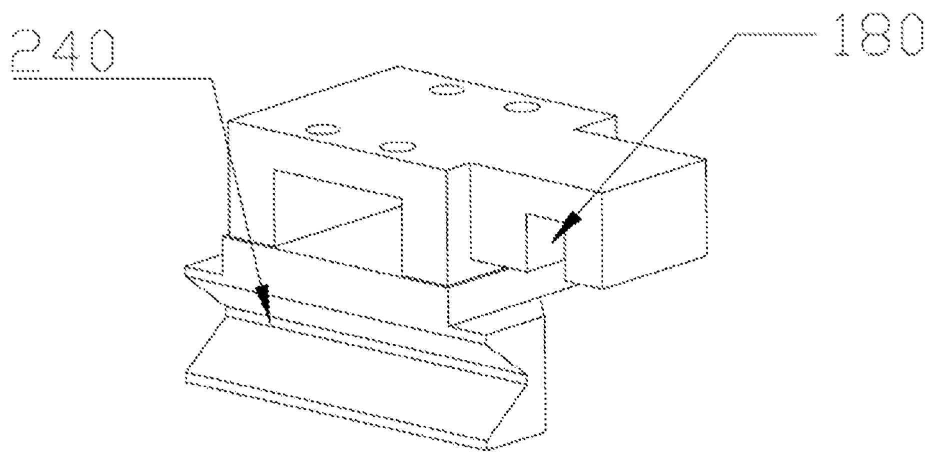
FIG. 12 shows a structural schematic diagram of a clamping structure in the explosive diagram of the grasping and shaking device of the fried food preparation system shown in FIG. 10.

Referring to FIG. 6, in an optional embodiment, the manipulator arm assembly 200 comprises a manipulator arm 202 and a support frame 201, wherein a base of the manipulator arm 202 is arranged on the support frame 201, and the other end of the mechanical arm 202 is provided with a grasping and shaking device 700, which is connected with the frying basket 800.

The manipulator arm assembly 200 comprises a manipulator arm 202 and a support frame 201, wherein the support frame 201 may be a C-shaped frame, so that the movement of the frying basket 800 driven by the manipulator arm assembly 202 may not be affected. One end of the manipulator arm assembly 202 with the base is fixed to the support frame 201, while the other end of the manipulator arm assembly 202 is provided with a grasping and shaking device 700 which is capable of grasping and shaking the frying basket 800. In this manner, the food in the frying basket 800 may be dispersedly shaken instead of being piling up, thus it may be easy to cook thoroughly.

Referring to FIGS. 7-12, in an optional embodiment, the grasping and shaking device 700 comprises a assembly of a gripper 900 and a shaking component.

The assembly of the gripper 900 comprises a gripper 900 which is provided with two fingers 110 thereon, wherein both of the fingers 110 move on the gripper 900 along a third direction.

The shaking component includes an actuator 170, two mounting plates 120, and clamping structures 160 that are arranged on the mounting plates 120 respectively, wherein each of the fingers 110 is provided with one mounting plate 120 thereon, and two clamping structures 160 are configured for cooperating with clamping the frying basket.

The clamping structures 160 are connected with the actuator 170, and the actuator 170 is configured for moving the clamping structures 160 along a fourth direction.

Each of the mounting plate 120, at one end away from the finger 110, is provided with a slide rail 130 on which a slide block 150 is slidably disposed, and each of the clamping structures 160 is provided on the corresponding slide block 150, wherein the fourth direction is the length direction of the slide rail 130.

Two actuators 170 are provided, wherein each of the mounting plates 120 is fixedly provided with one actuator, which is connected with the corresponding clamping structure 160 for moving it along the fourth direction.

The assembly of the gripper 900 of the grasping and shaking device 700 is configured for clamping the frying basket 800. Two fingers 110 are provided on the gripper 900, wherein the two fingers 110 may be close to and away from each other. Each finger 110 is provided with one mounting plate 120, wherein a slide rail 130 is arranged on each of the mounting plates 120, and a slide block 150 is arranged on each of the slide rails 130, so that the actuator 170 makes the clamping structures 160 move back and forth along the fourth direction, and the clamping structures 160 clamp the frying basket 800, therefore the frying basket 800 moves back and forth in the fourth direction, achieving the shaking of the frying basket 800, such that the food inside the frying basket 800 is scattered.

In an optional embodiment, the assembly of the gripper 900 further comprises a connecting plate 190 on which the gripper 900 is fixedly arranged thereon, and the connecting plate 190 is configured to connect with the manipulator arm 202.

The actuator 170 is fixedly arranged on the connecting plate 190, and a telescoping plate 220 is provided on the actuator 170, wherein a guide rod 230 is disposed on the telescoping plate 220, and the length direction of the guide rod 230 is the same as the third direction.

The each of the clamping structures 160 is provided with a guide groove 180 that is matched with the guide rod 230, and the actuator 170 makes the clamping structures 160 move along the slide rail 130 by moving the guide rod 230 along the fourth direction.

The gripper 900 is fixed to the connecting plate 190 of the assembly of the gripper 900, and the connecting plate 190 is connected to the manipulator arm assembly 202, thus enabling the connection between the grasping and shaking device 700 and the manipulator arm assembly 200, so that the grasping and shaking device 700 can move with the manipulator arm assembly 200.

The gripper 900 and the actuator 170 are respectively fixed on the connecting plate 190, wherein the actuator 170 is generally a telescopic cylinder on which a telescoping plate 220 is provided, and the actuator 170 makes the telescoping plate 220 repeatedly retract. The guide rod 230 is provided on the telescoping plate 220, and the guide grooves 180 of the clamping structures 160 are fitted with the guide rod 230, whereby the guide rod 230 enables the clamping structures 160 to move back and forth along the slide rail 130, without affecting the movement of the clamping structures 160 along the guide rod 230 in the length direction.

Only one actuator 170 may be applied, and the actuator 170 is connected to the guide grooves 180 of the two clamping structures 160 through the guide rod 230 on the telescoping plate 220 at the same time, so that one actuator 170 may simultaneously drive the two clamping structures 160 to move back and forth, thereby achieving shaking.

In an optional embodiment, the frying basket 800 comprises a basket body 801 and a positioning rod 803, and the positioning rod 803 is disposed on a handle 802 of the frying basket body 801.

The positioning rod 803 is cylindrical, and the length direction of the positioning rod 803 is perpendicular to the length direction of the handle 802.

The deep fryer assembly 300 comprises a deep fryer that provided with a positioning block 250 thereon. The positioning block 250 is provided with a first positioning slot 252 matched with the handle 802 and a second positioning slot 251 matched with the positioning rod 803.

In an optional embodiment, each of the clamping structures 160 is provided with a V-shaped groove 240, and the handle 802 of the frying basket body 801 is stuck in the V-shaped groove 240.

A positioning block 250 is arranged on the deep fryer of the deep fryer assembly 300, wherein the first positioning slot 252 of the positioning block 250 is configured for positioning the handle 802, and the second positioning slot 251 is configured for positioning the positioning rod 803. Since the length of the handle 802 is perpendicular to that of the positioning rod 803, the positioning block 250 fixes the handle 802 on the deep fryer, so that the handle 802 can only be moved out from above of the positioning block 250, ensuring that the frying basket 800 does not move in a horizontal plane.

In order to enable the clamping structures 160 to better clamp the handle 802 of the frying basket 800, each of the clamping structures 160 is provided with a V-shaped groove 240, and the handle 802 is stuck in the V-shaped groove 240, so that the two clamping structures 160 may more firmly clamp the frying basket 800.

Figure 13:
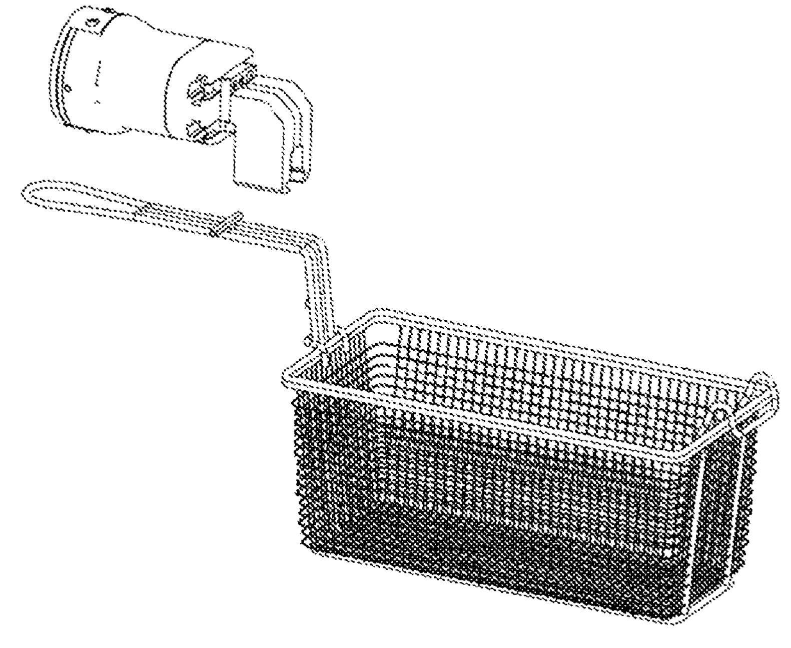
FIG. 13 shows a structural schematic diagram of the grasping and shaking device of the fried food preparation system according to an embodiment of the present disclosure in which an electric gripper is applied.
Figure 14:
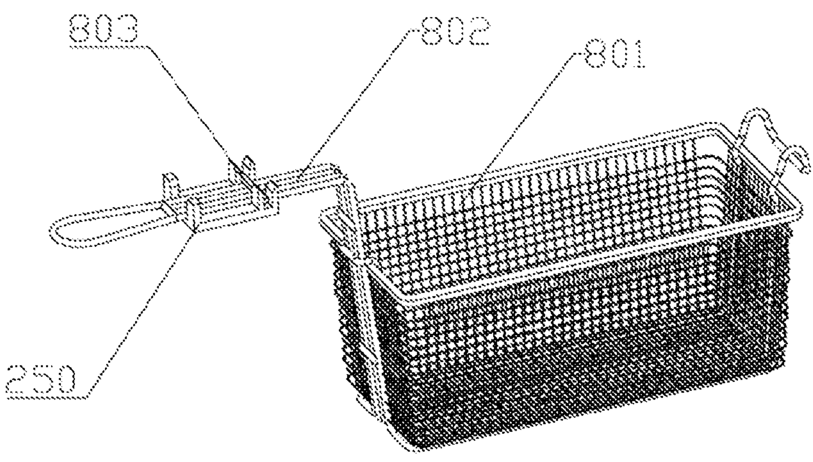
FIG. 14 shows a structural schematic diagram of a connection between a frying basket and a positioning block of the fried food preparation system according to an embodiment of the present disclosure.
Figure 15:
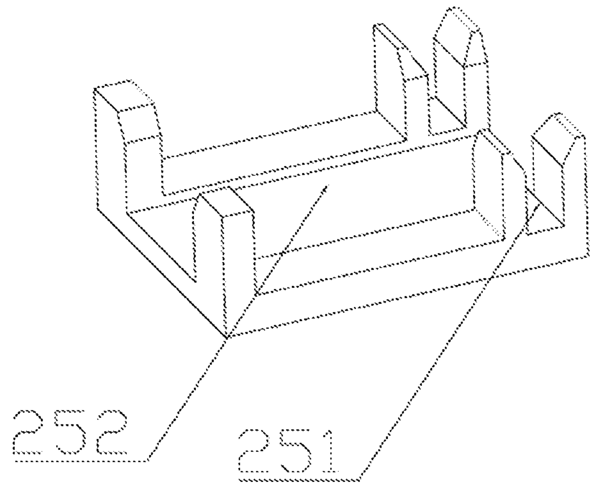
FIG. 15 shows a structural schematic diagram of the positioning block shown in FIG. 14.
Figure 16:
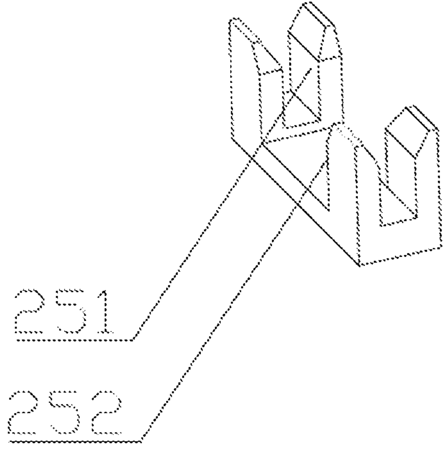
FIG. 16 shows another structural schematic diagram of the positioning block shown in FIG. 14.
Figure 17:
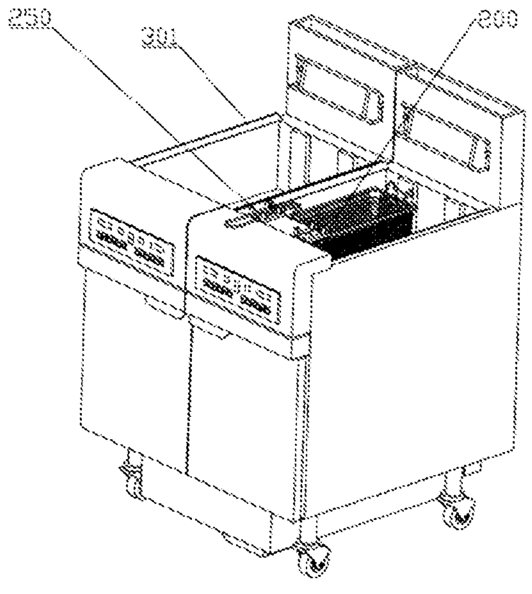
FIG. 17 shows a structural schematic diagram of a connection between a deep fryer assembly and the frying basket of the fried food preparation system according to an embodiment of the present disclosure.

Referring to FIG. 13, the fried food preparation system, instead of using a grasping and shaking device 700, applies an electric gripper 900 which is likewise capable of clamping the frying basket 800 and completing grasping of it. The shaking of the frying basket 800 is implemented by the manipulator arm 202, and the advantageous benefit thereof is that the structure is simple and no air source is needed, however, the shaking effect thereof is not as good as that of the grasping and shaking device.

In an optional embodiment, the manipulator arm 202 has a plurality of rotary shafts 2021, and each of which has the same length direction.

Figure 5:
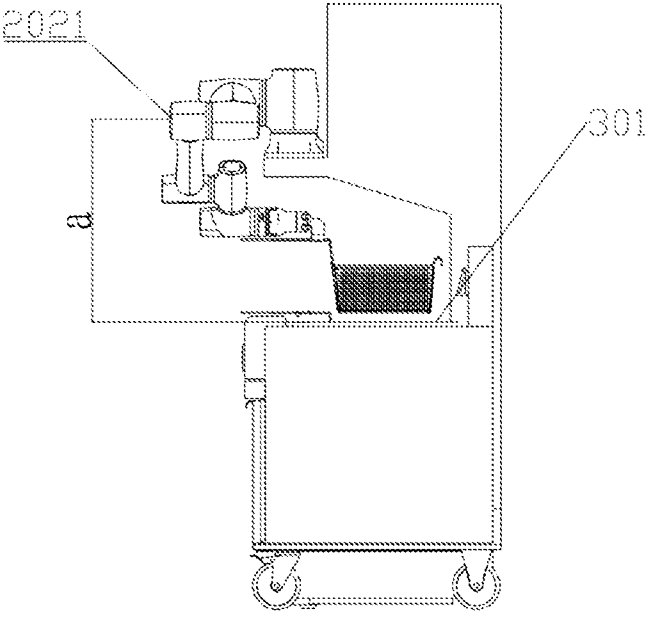
FIG. 5 shows a further structural diagram of the fried food preparation system according to an embodiment of the present disclosure.

Referring to FIG. 5, in an optional embodiment, the distance between the uppermost rotary shaft 2021 of the plurality of rotary shafts 2021 and the upper end surface 301 of the deep fryer of the deep fryer assembly 300 is a, and a is greater than 400 mm.

The manipulator arm 202 has a plurality of rotary shafts 2021, wherein the uppermost rotary shaft 2021 is at least 400 mm higher than the upper end surface 301 of the deep fryer, thus leaving a space for the movement of the frying basket 800, enabling the manipulator arm 202 to put the frying basket 800 into the deep fryer or take it out of the deep fryer.

The distance between the uppermost rotary shaft 2021 and the upper surface 301 of the deep fryer of the deep fryer assembly 300 is appropriately adjusted according to the different specifications of the frying basket 800.

The rotary shafts 2021 on the manipulator arm 202 is generally perpendicular to a plane formed by the first direction and the second direction, so that the manipulator arm 202 can make the frying basket 800 only move in one plane, thus limiting the moving space of the frying basket 800.

In the above, the manipulator arm 202 may apply a three-shaft or six-shaft manipulator arm 202. Moreover, the system may complete the whole process of fried food preparation regardless of applying an industrial manipulator arm 202, a cooperative manipulator arm 202, or a manipulator arm 202 with more than 3 shafts, all of which are within the protection scope of the present disclosure.

Figure 18:
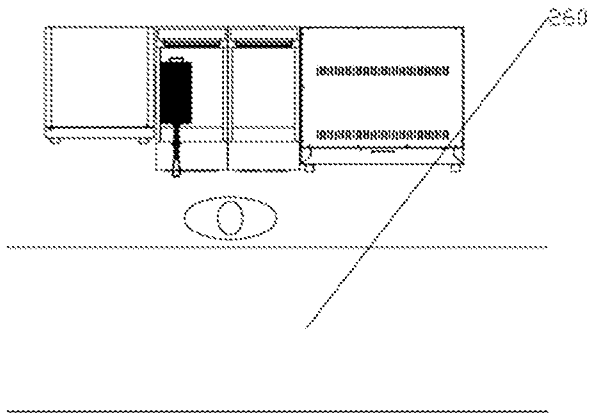
FIG. 18 shows a schematic diagram of an installed artificial frying equipment in the prior art.

Referring to FIG. 18, which shows a combination of standard equipment for fried food preparation in western food restaurants such as McDonald's and KFC in China, and fast food restaurants and chain stores in the United States and Europe (market capacity is millions). The combination of standard equipment thereof comprises a food dispenser, a deep fryer and a cooked food temporary storage station. If the empty frying basket 800 is placed at the outlet under the food dispenser, by triggering the switch and opening the door at the outlet, the food will fall in the frying basket 800, the frying basket 800 is manually put into the deep fryer, and the basket 800 is shaken to prevent from caking. After 3 minutes, the frying basket 800 is taken out of the deep fryer and poured into the cooked food temporary storage station, and the cooked food is manually divided into small portions for customers at the temporary storage station.

Figure 19:
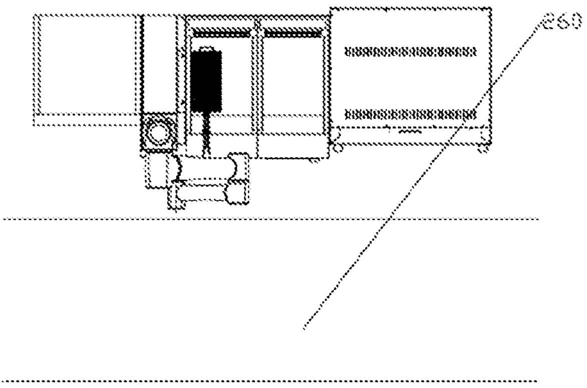
FIG. 19 shows a schematic diagram of the installed fried food preparation system according to an embodiment of the present disclosure.

Referring to FIG. 19, in the fried food preparation system of the present disclosure, the manipulator arm 202 does not additionally increase the occupied area of the passage 260, i.e. the fried food preparation system of the present disclosure may replace the combination of the current mainstream standard equipment for fried food preparation, and there is no need for additional space, which reduces the cost of replacement and be conducive to the promotion and application of the fried food preparation system.

Figure 20:
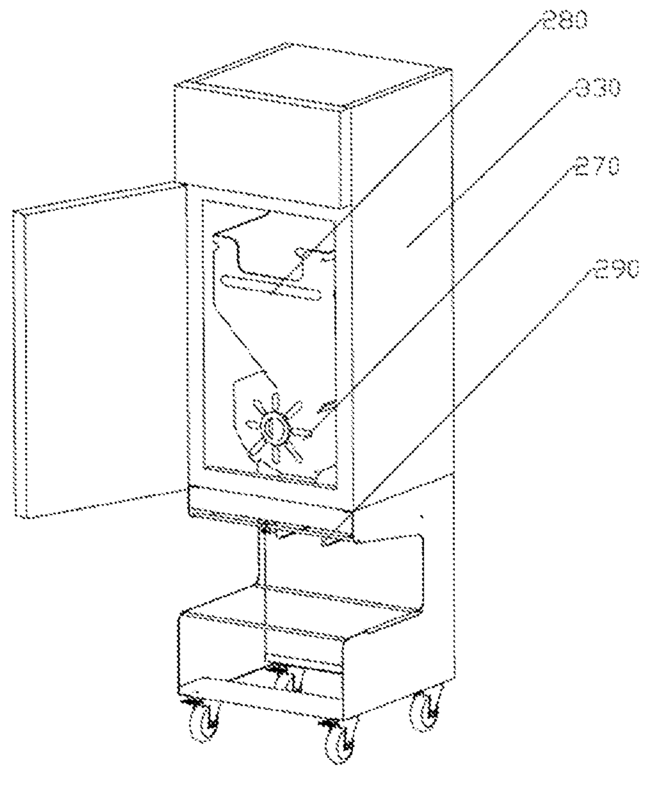
FIG. 20 shows a schematic diagram of the structure of the food dispenser assembly of the fried food preparation system according to an embodiment of the present disclosure.
Figure 21:
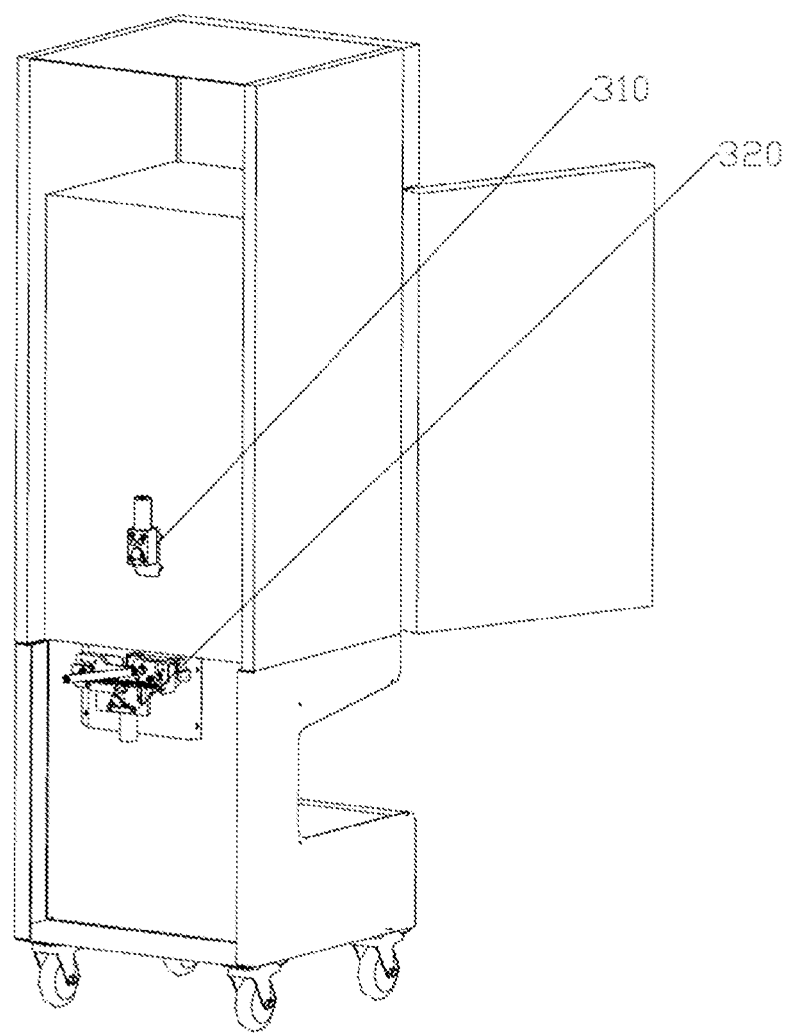
FIG. 21 shows a structural schematic diagram of the food dispenser assembly from another angle shown in FIG. 20.

Referring to FIGS. 20 and 21, the frozen food of the food dispenser assembly 100 of the fried food preparation system is placed into the food bucket 280 in the freezer 330, then the door is closed for refrigeration, and at this time the discharge door 290 is closed, wherein when needed, the wave wheel motor 310 drives the wave wheel 270 to rotate, and the food falls onto the weighing mechanism 320 for weighing. After reaching the required weight, the wave wheel 270 stops rotating, and when the frying basket 800 triggers the switch or the computer sends a command, the discharge door 290 opens to discharge.

In an optional embodiment, the system further comprises a cooked food storage station 400 disposed on a side of the deep fryer assembly 300 away from the manipulator arm assembly 200.

Figure 22:
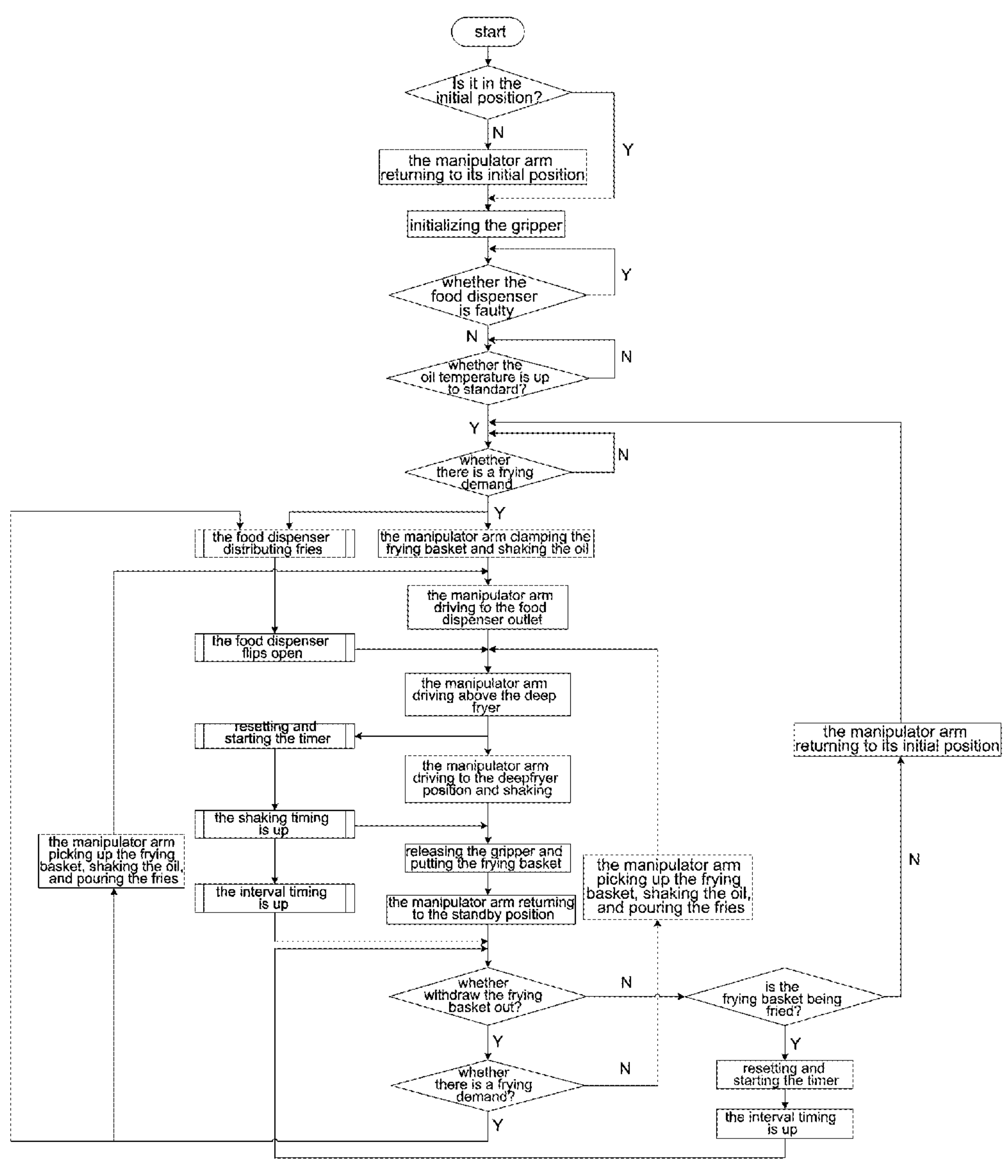
FIG. 22 shows a flowchart of the fried food preparation system according to an embodiment of the present disclosure.

Referring to FIG. 22, it shows the flowchart of the fried food preparation system. When the fried food preparation system starts to operate, it is first determined whether the manipulator arm 202 is in the initial position, wherein if not, it returns the manipulator arm 202 to the initial position and initializes the gripper 900 on the manipulator arm 202; then, it is judged whether the food dispenser is faulty and whether the oil temperature in the deep fryer assembly 300 is up to standard in turn. When everything is normal and a frying is required, the food dispenser of the food dispenser assembly 100 begins to distribute French fries, wherein the manipulator arm 202 makes the frying basket 800 run to the outlet of the food dispenser, and the manipulator arm 202 enables the frying basket 800 to receive the food at the outlet, then the manipulator arm 202 moves the frying basket 800 above the deep fryer, at this time the positioner is reset and pneumatically operated, and the manipulator arm 202 makes the frying basket 800 enter the deep fryer. When the shaking timing is up, the manipulator arm 202 shakes the frying basket 800, and when the interval timing is up, at this time the manipulator arm 202 releases the frying basket 800, and returns to the standby position. Based on actual demand, the manipulator arm 202 may clamp the frying basket 800 again, or take out the frying basket 800 in the deep fryer and put it in the cooked food storage station 400. Based on further demand, the manipulator arm 202 may clamp a frying basket 800 in which food is not fried and put it in the deep fryer, and a timer is reset or the manipulator arm 202 returns to the initial position according to whether there is a need for taking out the frying basket 800 or a need for a new frying basket to fry again.

Generally, the deep fryer assembly 300 has four deep fryers, which, according to the distance from the manipulator arm assembly 200, are shown as 1, 2, 3, 4 in turn from far to near, wherein a rotation priority of the frying basket in the deep fryer is 1>3>2>4.

In this disclosure, the deep fryer assembly 300 and the food dispenser assembly 100 of the fried food preparation system are respectively arranged on both sides of the manipulator arm assembly 200 in parallel, wherein the manipulator arm assembly 200 enables the frying basket 800 to move in a plane formed by a first direction and a second direction, such that the frying basket 800 is enabled to move from the food dispenser assembly 100 to the deep fryer assembly 300, and the manipulator arm assembly 200 can only move in one plane during a movement of the frying basket 800, thus reducing the occupied space, and the space requirements of the entire fried food preparation system is reduced.

Finally, it should be noted that: the above embodiments are only used to illustrate the technical solutions of the present disclosure, not to limit it. While the present disclosure has been described in detail with reference to the preceding embodiments, it will be understood by those of ordinary skill in the art that, one may still modify the technical solutions described in the preceding embodiments, or replace some or all of the technical features equally, and these modifications or substitutions do not make the essence of the corresponding technical solutions depart from the scope of the technical solutions of the embodiments of the present disclosure.

What is claimed is:

1. A fried food preparation system, comprising:

a food dispenser assembly, a manipulator arm assembly, a deep fryer assembly and a frying basket, wherein the deep fryer assembly and the food dispenser assembly are respectively arranged in parallel on both sides of the manipulator arm assembly;

the manipulator arm assembly is connected with the frying basket, and the manipulator arm assembly moves the frying basket in a plane formed by a first direction and a second direction, wherein the first direction is the direction from the deep fryer assembly to the food dispenser assembly, and the second direction is a height direction;

the manipulator arm assembly comprises a manipulator arm and a support frame, wherein the manipulator arm has a base provided on the support frame, and the other end of the manipulator arm is provided with a grasping and shaking device which is connected with the frying basket;

the grasping and shaking device comprises a assembly of gripper;

the assembly of gripper comprises a gripper and two fingers which are provided on the gripper, and the two fingers move on the gripper along a third direction;

the grasping and shaking device further comprises a shaking component which is provided with an actuator, two mounting plates, and two clamping structures which are arranged on the two mounting plates respectively, wherein each of the fingers is provided with one mounting plate, and the two clamping structures are configured for clamping the frying basket cooperatively;

the clamping structures are connected with the actuator, and the actuator is configured to make the clamping structures move along a fourth direction; and each of the mounting plates, at one end away from the corresponding finger, is provided with a slide rail on which a slide block is slidably disposed, and the clamping structures are provided on the slide blocks respectively, wherein the fourth direction is a length direction of the slide rail.

2. The fried food preparation system according to claim 1, further comprising a slide base, wherein the manipulator arm assembly is arranged on the slide base; and the deep fryer assembly and/or the food dispenser assembly are also arranged on the slide base.

3. The fried food preparation system according to claim 1, wherein two actuators are provided, wherein each of the actuators is fixedly arranged on one of the mounting plates, and each of the actuators is connected with a corresponding clamping structure, so as to make the clamping structure move along the fourth direction.

4. The fried food preparation system according to claim 1, wherein the assembly of the gripper further comprises a connecting plate, wherein the gripper is fixedly arranged on the connecting plate, and the connecting plate is configured to connect with the manipulator arm.

5. The fried food preparation system according to claim 4, wherein the actuator is fixedly arranged on the connecting plate, and a telescoping plate is provided on the actuator, wherein a guide rod is disposed on the telescoping plate, and the third direction is a length direction of the guide rod; and each of the clamping structures is provided with a guide groove which is matched with the guide rod, and the actuator makes the clamping structures move along the slide rail by moving the guide rod along the fourth direction.

6. The fried food preparation system according to claim 1, wherein the frying basket comprises a frying basket body and a positioning rod, and the positioning rod is disposed on a handle of the frying basket body, wherein the positioning rod is cylindrical, and a length direction of the positioning rod is perpendicular to a length direction of the handle; and the deep fryer assembly comprises a deep fryer which is provided with a positioning block thereon, wherein the positioning block is provided with a first positioning slot matched with the handle and a second positioning slot matched with the positioning rod.

7. The fried food preparation system according to claim 6, wherein each of the clamping structures is provided with a V-shaped groove, and the handle of the frying basket body is stuck in the V-shaped groove.

8. The fried food preparation system according to claim 1, wherein the manipulator arm has a plurality of rotary shafts, and a length direction of the plurality of rotary shafts is the same.

9. The fried food preparation system according to claim 8, wherein the distance between an uppermost rotary shaft of the plurality of rotary shafts and an upper end surface of the deep fryer of the deep fryer assembly is a, wherein a is greater than 400 mm.

10. The fried food preparation system according to claim 1, further comprising a cooked food storage station, wherein the cooked food storage station is disposed on a side of the deep fryer assembly away from the manipulator arm assembly.

* * * * *